(12) United States Patent
Ganguli et al.

(10) Patent No.: US 6,514,454 B1
(45) Date of Patent: *Feb. 4, 2003

(54) SOL-GEL PROCESS USING POROUS MOLD

(75) Inventors: Rahul Ganguli, Camarillo, CA (US); Fikret Kirkbir, Los Angeles, CA (US); Douglas Meyers, Calabasas, CA (US)

(73) Assignee: Yazaki Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/807,109

(22) PCT Filed: Oct. 7, 1999

(86) PCT No.: PCT/US99/23364

§ 371 (c)(1),
(2), (4) Date: Apr. 5, 2001

(87) PCT Pub. No.: WO00/20331

PCT Pub. Date: Apr. 13, 2000

Related U.S. Application Data

(63) Continuation-in-part of application No. 09/234,738, filed on Jan. 21, 1999, now Pat. No. 6,099,792.
(60) Provisional application No. 60/103,346, filed on Oct. 7, 1998.

(51) Int. Cl.⁷ .............................................. C04B 35/14
(52) U.S. Cl. .................... 264/621; 264/651; 264/86; 249/134; 65/17.2
(58) Field of Search ............................ 264/621, 651, 264/86; 249/134; 65/17.2

(56) References Cited

U.S. PATENT DOCUMENTS

| | | | |
|---|---|---|---|
| 4,561,872 A | 12/1985 | Luong et al. ................. | 65/18.1 |
| 4,680,049 A | 7/1987 | Onorato et al. .............. | 65/18.1 |
| 4,684,385 A * | 8/1987 | Clasen ......................... | 264/86 |
| 4,925,603 A | 5/1990 | Nambu ......................... | 264/28 |
| 5,023,208 A * | 6/1991 | Pope et al. ................... | 501/12 |
| 5,076,980 A * | 12/1991 | Nogues et al. ................ | 264/65 |
| 5,156,895 A * | 10/1992 | Martin ......................... | 428/72 |
| 5,236,483 A | 8/1993 | Miyashita et al. ............ | 65/17 |
| 5,275,796 A * | 1/1994 | Tillotson et al. ............ | 423/338 |
| 5,473,826 A * | 12/1995 | Kirkbir ........................ | 34/405 |
| 5,553,658 A | 9/1996 | Cornie ......................... | 164/97 |
| 5,558,849 A | 9/1996 | Sharp .......................... | 423/338 |
| 5,686,031 A * | 11/1997 | Coronado et al. ......... | 264/40.1 |
| 6,099,792 A * | 8/2000 | Ganguli et al. ............. | 264/621 |

FOREIGN PATENT DOCUMENTS

SU 1680623 9/1991

* cited by examiner

Primary Examiner—James Derrington
(74) Attorney, Agent, or Firm—Sheppard, Mullin, Richter & Hampton LLP; Oral Cagler

(57) ABSTRACT

A sol-gel process for producing dry porous gel monoliths, e.g., silica glass monoliths, in which the successive process steps of gelling, aging and drying all occur within a mold formed of a selected porous material, e.g., graphite. The mold is inert to the gel solution and it has sufficient strength to withstand the temperatures and pressures encountered during the process. The mold and gel thereby can remain within a sealed autoclave during these process steps, and mechanical handling of the mold and the gel are minimized. This substantially enhances the process' efficiency. Alternatively, the mold can have a non-porous inner skin to enhance ease of cleaning of the mold, and of removal of the gel.

31 Claims, 1 Drawing Sheet

SOL-GEL PROCESS USING POROUS MOLD

This is a continuation-in-part of application Ser. No. 09/234,738, filed Jan. 21, 1999, now U.S. Pat. No. 6,099,792, which claims benefit of U.S. Provisional Application No. 60/103,346 filed Oct. 7, 1998.

BACKGROUND OF THE INVENTION

This invention relates generally to sol-gel processes for producing dry gel monoliths that subsequently can be sintered into metal oxide articles and, more particularly, relates to sol-gel processes of this kind using molds specially configured to enhance the process' effectiveness.

Substantial efforts have recently been expended in developing improved sol-gel processes for fabricating high-purity monolithic articles of metal oxide. In such processes, a desired solution, i.e., a sol, containing metal-oxide-forming compounds, solvents, and catalysts, is poured into a mold and allowed to react. The solution typically includes a metal alkoxide, water, an alcohol, and an acid and/or base catalyst. Typical metal alkoxides include tetraethyl orthosilicate (for forming articles of silica) and tetrabutyl titanate (for forming articles of titanium dioxide). Following hydrolysis and condensation reactions, the sol forms a porous matrix of solids, i.e., a gel. With aging, the gel shrinks in size by expelling fluids from the pores of the gel. The wet gel is then dried in a controlled environment, typically by removing the gel from the mold and placing it into an autoclave for subcritical or supercritical heating. The dried gel then is sintered into a solid monolith.

Advantages of the sol-gel process include chemical purity and homogeneity, flexibility in the selection of compositions, the ability to process at relatively low temperatures, and the producing of monolithic articles close to their final desired shapes, thereby minimizing finishing costs.

The efficiency of the process can be enhanced if the steps of gelling, aging and drying all are carried out within a single chamber and without the need to remove the gel from the mold. The need to remove the gel from the mold at an intermediate step of the process not only requires mechanical handling of the fragile gel and mold, but also lengthens the processing time. This is because removing the gel from the mold following the step of aging can be performed only after the gel has cooled to room temperature from its aging temperature e.g., 60° C.

An important factor bearing on the ability to perform the entire sol-gel process without removing the gel from the mold is the nature of the material from which the mold is formed. The ideal mold material should have good release characteristics, such that the fragile monolithic gel can be removed from the mold without damage.

The mold material also should be inert to attack from chemicals used in the sol-gel process, e.g., acid catalysts such as hydrochloric acid (HCl) and base catalysts such as ammonium hydroxide ($NH_4OH$). This requirement effectively precludes the use of molds formed of metal, because metal impurities could be leached from the mold and trapped in the gel, thus being retained in the metal oxide monolith. Metal impurities retained within a metal oxide monolith are particularly undesirable because they can lead to unacceptable material properties. For example, metal ions in fused silica photoblanks can degrade transmission of ultraviolet light by the photoblanks. Such leaching also can reduce the mold's life span.

Noble metal molds, while nonreactive, are extremely costly. Metal molds coated with Teflon or with noble metals are somewhat less costly, but the coating is usually imperfect, with pinhole openings that allow contamination of the monolith or that lead to degradation of the coating and the mold. Glass molds coated with passivating agents for noncontamination are difficult to machine and are usually unacceptably brittle.

If the gel is to be dried while still located within the mold, the mold material must be able to withstand typical drying temperatures, e.g., 200° C. and above. This means that the mold must not decompose at such temperatures and it should not deform when repeatedly cycled between room temperature and the maximum drying temperature. This requirement effectively excludes the use of molds formed of common organic polymeric materials such as polymethyl pentane and Teflon, which have softening temperatures substantially lower than 200° C.

It should therefore be appreciated that there is a need for a sol-gel process in which the steps of gelling, aging and drying all are carried out without removing the material from the mold. The present invention fulfills this need and provides further related advantages.

SUMMARY OF THE INVENTION

The present invention resides in an improved sol-gel process for producing a dry porous gel monolith, in which the process steps of gelling, aging and drying all are carried out while the gel remains within a mold, thus substantially reducing mechanical handling of the gel and mold and substantially enhancing the process' efficiency. More particularly, the process incorporates steps of 1) placing a solution into a mold formed of a material such as graphite, silicon carbide, titanium carbide, or tungsten carbide, 2) allowing the solution to gel within the mold, 3) drying the gel within the mold, and 4) removing the dried gel from the mold to obtain the gel monolith.

The process is useful when used to produce gel monoliths from solutions comprising various metal alkoxides, such as $SiO_2$, $TiO_2$, $Al_2O_3$ and ZrO. The process has particular advantages when used to produce gel monoliths in the form of high-purity silica. In such applications, the solution consists essentially of tetraethyl orthosilicate, an alcohol, deionized water, and an acid catalyst and/or a base catalyst, in prescribed relative proportions. In addition, the process can further include a step of aging the gel within the mold, before the step of drying, and a further step of sintering the dried gel after the step of removing.

In one configuration, the mold is configured to be substantially homogeneous and porous. In an alternative configuration, the mold is configured to have a porous body with a substantially non-porous inner skin. In the alternative configuration, the non-porous skin prevents plugging of the pores of the mold with gel material, allowing for easier cleaning of the mold and reduced sticking and contamination of the metal oxide monolith. In both configurations, the pore liquid escapes from the narrow annular space between the mold and the gel. In addition, for a porous mold, the mold's porosity facilitates this drying by allowing the liquid contained within the gel's pores to escape directly through the mold itself. The mold preferably has a substantially uniform thickness in the range of 3 to 5 mm. In the case of molds formed of graphite, the graphite preferably has a bulk density of about 1.75 gm/cm$^3$ and a porosity in the range of about 10 to 15%.

In other more detailed features of the invention, the steps of allowing the solution to gel, aging the gel, and drying the gel all occur while the solution and gel remain located within the mold. In addition, these steps all occur while the mold is located within an autoclave. The step of drying the gel in the autoclave can occur either under subcritical or supercritical conditions.

Other features and advantages of the present invention should become apparent from the following description of the preferred process, taken in conjunction with the accompanying drawing, which illustrates, by way of example, the principles of the invention.

BRIEF DESCRIPTION OF THE DRAWING

The FIGURE is a sectional elevational view of a porous graphite mold located within an autoclave and specially configured for use in a sol-gel process for producing metal oxide monoliths.

DESCRIPTION OF THE PREFERRED PROCESS

Figure 1:
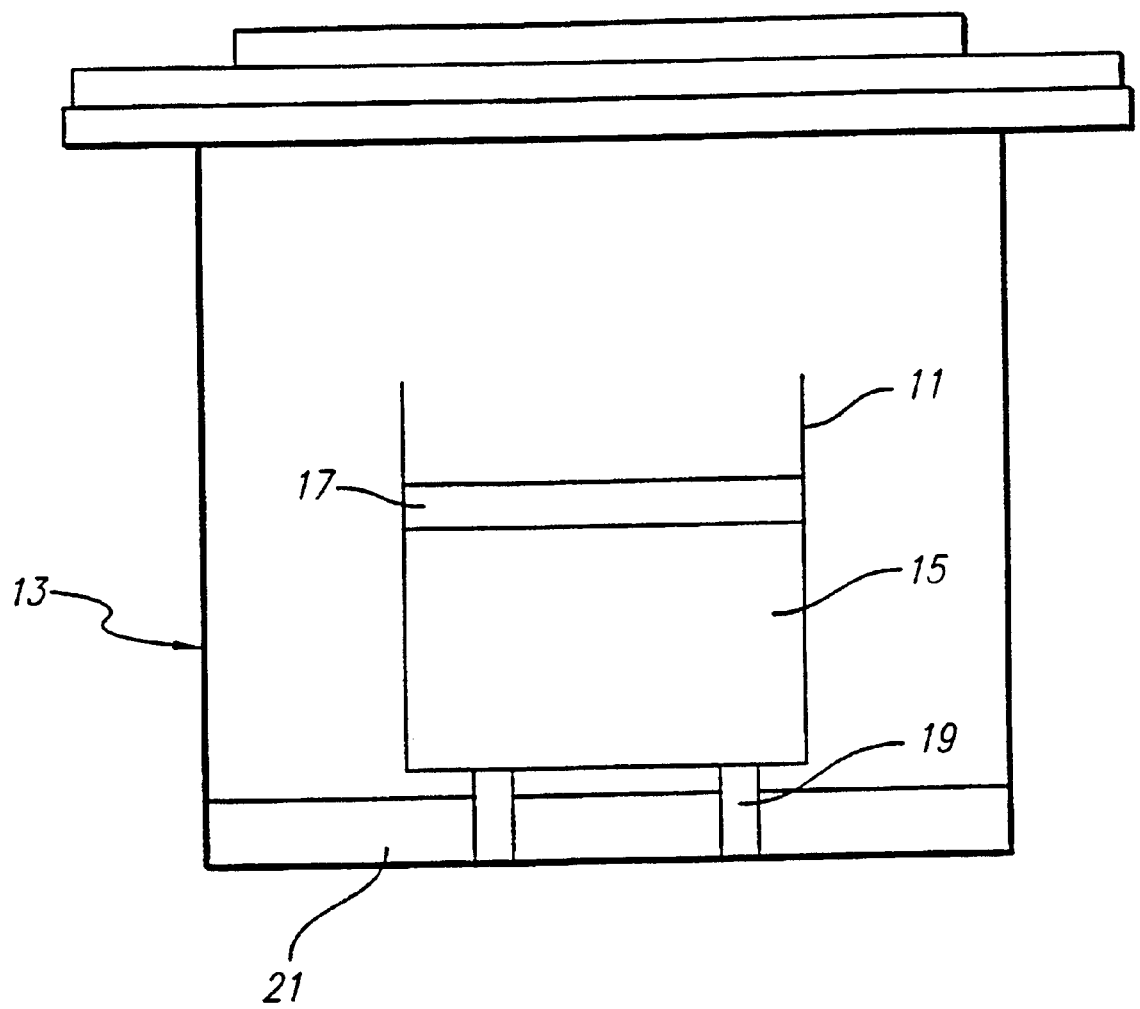

To illustrate the preferred process, an example of the process for producing a silica gel is provided below.

With reference now to the illustrative FIGURE, there is shown a mold 11 located within an autoclave 13, for use in a sol-gel process for producing crack-free silica monoliths. The mold has a size and shape substantially the same as that desired for the monolith to be produced, and it is formed of a porous graphite material, which enables the successive sol-gel process steps of gelling, aging and drying all to be carried out without the need to remove the gel from the mold.

In an initial step of the process, a suitably hydrolyzed silicon alkoxide sol is poured into the mold 11 and allowed to gel at room temperature for about 16 hours. One suitable sol can comprise tetraethyl orthosilicate (TEOS), ethanol, deionized water, hydrochloric acid, and ammonia, in relative molar proportions of about 1:1.5:4: 0.0001:0.0003, respectively. Alternatively, tetramethyl orthosilicate (TMOS) can be substituted for the TEOS as an appropriate silicon alkoxide. Also, as is discussed below, other metal alkoxides can be used to produce monoliths of materials other than silicon.

After the sol has gelled to form a gel 15, a suitable amount of fresh liquid 17 is added to the mold 11, to top off and fully immerse the gel. This helps to prevent the gel from cracking during the subsequent step of aging. It also eliminates the need to use a lid on the mold, thus simplifying the process. The composition of this added liquid preferably is the same as the pore liquid contained within the gel, and will vary for different gels. In this particular case, this liquid is 80–95% ethanol and 5–20% water. The depth of the liquid should be 1–20 mm. Less depth will not effectively prevent cracking of the gel during aging, while greater depth will cause undesirable changes in the gel microstructure.

The graphite mold 11 with the immersed gel 15 is then introduced into the autoclave 13, where it is elevated above the floor of the autoclave on a support 19, and the temperature within the autoclave is raised to about 60° C. over a span of about six hours, and maintained at that temperature for about 42 hours. During this aging step, a saturated ambient is maintained within the autoclave by providing an excess of pore liquid on the floor of the autoclave, as indicated by the reference numeral 21. The aging step effectively increases the gel's average pore size and strengthens the gel, so as to reduce the gel's susceptibility to cracking during the subsequent step of drying. The duration of the aging step should be in the range of 36 to 100 hours. Shorter durations will be insufficient to fully age the gel, and longer durations may cause the liquid 17 to evaporate completely, causing premature drying and resultant cracking.

After the aging step has been completed, a drying solvent, e.g., isopropanol, is introduced into the autoclave 13, and the temperature and pressure within the autoclave are raised according to prescribed profiles. Drying can be achieved using both subcritical and supercritical procedures. One suitable subcritical drying procedure is disclosed in U.S. Pat. No. 5,473,826, which is incorporated by reference.

Significantly, the step of drying is performed without first removing the gel 15 from the mold 11. In the preferred process, the mold is homogeneous and formed of an isomolded, fine-grained graphite material having high thermal conductivity and high strength. One suitable graphite material is available from Le Carbone-Lorraine, under the name Graphite Grade 2191. It has a bulk density of about 1.74 gm/cm$^3$, and it has a porosity of about 13%.

Alternatively, the graphite mold 11 can incorporate a non-porous, mirror-like portion defining its inner skin or wall. Incorporation of the skin prevents seepage of gel material into the mold pores. Preventing this seepage prevents sticking of the monolith to the mold, and makes easier the production of crack-free gels. Use of an inner skin also makes cleaning of the mold easier after use. This inner skin can be produced by deposition of non-porous graphite on the surface of the mold.

In addition, the mold can be formed of porous carbide materials such as silicon carbide, titanium carbide, tungsten carbide, and mixtures thereof. These materials can survive the required high temperatures and are reasonably inert. However, such materials are more difficult and expensive to machine into the required mold shapes than is graphite. In addition, these materials generally do not have good release characteristics, and gels can sometimes adhere to molds made of these materials. These problems can be reduced by using the carbide materials to form the non-porous inner skin discussed above. Deposition of these materials on a machined graphite mold will avoid the need to shape these materials, resulting in reduced cost. Also, when the carbide materials are used as a nonporous skin, rather than as a porous mold material, they provide for improved release characteristics.

The mold 11 has a size and shape substantially the same as that desired for the monolith to be produced, and it preferably has a uniform thickness in the range of about 3 to 5 mm. A minimum thickness of 3 mm will ensure that the mold has adequate structural integrity, and a maximum thickness of 5 mm will ensure that the mold will not unduly inhibit the escape of pore liquid during the step of drying. When a mold having a non-porous inner skin is used, the inner skin preferably has a uniform thickness less than about 1 mm.

Presented below is a more detailed description of the preferred process for producing dry silica gel monoliths using a mold 11 formed of a porous graphite material. Although the process is described with particular reference to silica gel monoliths formed of silica, it will be appreciated that the use of a mold formed of a graphite material can enhance the efficient production of other aerogel or xerogel monoliths as well.

Mold Cleaning—For the graphite mold 11 to have the desired release properties, it is important that it be thoroughly cleaned of particles remaining inside the pores of the mold from a previous casting. This can be achieved by first immersing the mold in a dilute 7% hydrofluoric acid (HF) solution for 30 minutes, followed by an ultrasonic HF bath for 20 minutes. The mold then is immersed in deionized water for 30 minutes, followed by two successive ultrasonic baths in deionized water, for 20 minutes each. Finally, the mold is placed in a clean drying oven to dry. As is discussed above, this cleaning process is considerably easier if the mold used incorporates a nonporous skin.

Sol Preparation and Casting—The prescribed sol is mixed in a reactor vessel that has been appropriately cleaned with a dilute 7% HF solution. In the preferred process, for producing a silica gel monolith, this sol incorporates TEOS, ethanol, deionized water, HCl, and $NH_4OH$, in relative molar proportions of about 1:1.5:4:0.0001:0.0003, respectively. The sol is then transferred to the previously cleaned graphite mold 11, while located in a Class 100 laminar flow hood.

Gelation—The graphite mold 11, with the cast sol, is then introduced into the autoclave 13, for gelation. After the autoclave has been sealed, the sol is allowed to gel at room temperature for 16 hours. At that time, an aging solution having a composition of about 88% ethanol and 12% deionized water is pumped into the autoclave, to substantially fill the autoclave. The autoclave then is drained, leaving the mold topped off with the liquid and further leaving sufficient liquid 21 remaining on the floor of the autoclave to maintain a saturation pressure of 9 psi at 60° C. This topping liquid is added to inhibit cracking of the gel during the subsequent aging step and further to eliminate the need for a lid on the mold, thus simplifying the process. The FIGURE depicts the autoclave and mold at this stage of the process.

Aging—After the graphite mold 11 has been topped off with the prescribed aging solution, the temperature of the autoclave is linearly ramped up to 60° C. over a time span of 6 hours, and the temperature is then maintained at that temperature for a further 42 hours. This completes an in-situ aging step, in which the average pore size in the gel 15 is increased to a point where the gel can properly avoid cracking during the subsequent drying step.

Drying—After the step of aging has been completed, the aging solution 21 that remains on the floor of the autoclave 13 is drained away and pure isopropanol is pumped into the autoclave at a pressure of 9 psi, while the temperature is maintained at 60° C. About 1500 milliliters of isopropanol are added for an autoclave having a volume of 20 liters. The temperature of the autoclave is then linearly ramped up to 240° C. and allowed to equilibrate at that temperature for one hour. This typically increases the pressure to about 620 psi. The pressure within the autoclave is released over a period of about five hours, while the 240° C. temperature is maintained. Finally, the autoclave is cooled to room temperature and the graphite mold 11 and gel 15 are removed.

The dried, crack-free monolithic aerogel 15 then can be readily removed from the graphite mold 11. Following sintering, a pure silica monolith of optical quality is obtained. The mold then can be used again to produce further dry porous gel monoliths, if it is appropriately cleaned in the manner described above.

The special use of a mold 11 formed of graphite substantially enhances the efficiency of the sol-gel process. The use of this material is particularly effective, because it allows the successive sol-gel process steps of gelling, aging and drying all to be carried out without the need to remove the gel from the mold. Graphite also is a particularly advantageous material for the mold 11, because it can withstand temperatures greater than 300° C., under the specified drying conditions, without deforming or decomposing. In addition, graphite does not chemically interact with the specified sol, and it exhibits good mold release properties under controlled conditions. If any graphitic carbon is incidentally introduced as an impurity into the gel monolith, it can be readily removed during the sintering operation. Finally, molds formed of graphite are substantially less expensive than are molds formed of other conventional materials.

The process, though illustrated for production of silica monoliths, can be used to produce monoliths from other metal oxides, including oxides of titanium, aluminum, zirconium, germanium, tin, lead, and antimony. Preparation of the various solutions is known in the art, and described in various patents and publications. The gel materials can also include dopants such as erbium, neodymium, boron, and phosphorus. These dopants are known in the art, and are selected to impart particular functionality to the monolith produced. For example, erbium is used as a dopant in silica monoliths to produce fiber optic amplifiers. Also, germanium is used as a dopant in silica to produce graded optical refractive index glass (GRIN). Use of these dopants does not change substantially the use of the mold in the process.

As an additional example, the process for silica gel production described above can be modified to produce alumina gel. To do this, 50 grams of $Al_2O_3$ (for example, Alumina C available from Degussa, Inc.) is combined with n-butanol to produce a flowable suspension. This flowable suspension is then refluxed for 17 hours. Excess n-butanol and water are driven off by distillation. Then, 30 grams of this moist butoxylated alumina is mixed with 50 ml of chloroform in the mold described above. Addition of a few drops of 1,3-diaminopropane induces gelation. The mold containing the monolithic alumina is then dried according the drying process outlined above to yield alumina gel. Details for preparation of this solution are disclosed in U.S. Pat. No. 4,561,872 to Luong et al., col. 9, lines 41–49.

The process is also effective for production of titania gels. For example, tetrabutyl titanate is placed in a non-porous graphite mold under nitrogen atmosphere. Formic acid at 96% concentration is slowly added to the graphite mold to make a 4.89:1 acid:titanate mixture. The mixture then heats, without precipitation being seen. After 15 minutes, a gel forms in the mold. The mold containing the monolithic titania is then dried according the drying process outlined above to yield titania gel. Details for preparation of this solution are disclosed in U.S. Pat. No. 5,558,849 to Sham col. 9, lines 1–11. Similarly, other metal alkoxides can be used in the process for production of monoliths.

Although the invention has been described in detail with reference to the presently preferred process, those of ordinary skill in the art will appreciate that various modifications can be made without departing from the invention. Accordingly, the invention is defined only by the following claims.

We claim:

1. A process for producing a dry porous gel monolith comprising the steps of:

placing a solution comprising a metal alkoxide into a mold formed principally of a porous material selected from the group consisting of graphite, silicon carbide, titanium carbide, tungsten carbide, and mixtures thereof;

allowing the solution to gel within the mold;

drying the gel within the mold; and removing the dried gel from the mold to produce a dry porous gel monolith.

2. A process as defined in claim 1, wherein the mold used in the steps of placing, allowing, drying and removing is substantially homogeneous and formed principally of graphite.

3. A process as defined in claim 1, wherein the metal alkoxide comprises a metal selected from the group consisting of titanium, aluminum zirconium, germanium, tin, lead, and antimony.

4. A process as defined in claim 1, wherein the step of drying comprises a step of elevating the temperature of the gel sufficiently to dry the gel under supercritical conditions.

5. A process as defined in claim 1, wherein the step of drying comprises a step of elevating the temperature of the gel sufficiently to dry the gel under subcritical conditions.

6. A process as defined in claim 1, wherein the step of drying comprises a step of elevating the temperature of the gel to above 200° C.

7. A process as defined in claim 1, wherein:
the solution used in the step of placing consists essentially of the follow components, in prescribed relative proportions
  tetraethyl orthosilicate or tetramethyl orthosilicate,
  an alcohol,
  deionized water, and
  an acid catalyst and/or a base catalyst; and
the process further comprises a step of sintering the dried gel monolith after the step of removing, to produce a silica monolith.

8. A process as defined in claim 7, and further consisting a step of aging the gel within the mold, before the step of drying.

9. A process as defined in claim 1, wherein the solution used in the step of placing comprises the following components, in prescribed relative proportions:
  deionized water;
  colloidal silica;
  a dispersant; and
  an acid catalyst and/or a base catalyst.

10. A process as defined in claim 1, wherein the solution used in the step of placing consists essentially of the following components, in prescribed relative proportions:
  tetraethyl orthosilicate or tetramethyl orthosilicate;
  an alcohol;
  deionized water;
  colloidal silica;
  a dispersant; and
  an acid catalyst and/or a base catalyst.

11. A process as defined in claim 1, wherein the mold used in the steps of placing, allowing, drying and removing has sufficient porosity to allow liquid present in pores of the gel to escape therethrough.

12. A process as defined in claim 1, wherein the mold used in the steps of placing, allowing, drying and removing has a bulk density of about 1.75 gm/cm$^3$ and a porosity in the range of about 10 to 15%.

13. A process as defined in claim 1, wherein the mold used in the steps of placing, allowing, drying and removing has a substantially uniform thickness in the range of 3 to 5 mm.

14. A process as defined in claim 1, wherein:
  the process further comprises a step of adding the gel within the mold, before the step of drying; and
  wherein the step of aging includes a step of adding a topping liquid to the mold, wherein the topping liquid has substantially the same composition as the pore liquid and is added to a depth in the range of about 1 to 20 mm.

15. A process as defined in claim 1, wherein:
  the process further comprises a step of aging the gel within the mold, before the step of drying; and
  the steps of allowing the solution to gel, aging the gel, and drying the gel all occur while the solution and gel remain located within the mold.

16. A process as defined in claim 15, wherein the steps of allowing the solution to gel, aging the gel, and drying the gel all occur while the mold is located within an autoclave.

17. A process for producing a dry porous gel monolith comprising the steps of:
  placing a solution comprising a metal alkoxide into a mold formed principally of a material selected from the group consisting of graphite, silicon carbide, titanium carbide, tungsten carbide, and mixtures thereof, and that has a porous body and a non-porous inner skin;
  allowing the solution to gel within the mold;
  drying the gel within the mold; and
  removing the dried gel from the mold to produce a dry porous gel monolith.

18. A process as defined in claim 17, wherein the porous body of the mold used in the steps of placing, allowing, drying and removing is formed principally of graphite.

19. A process as defined in claim 17, wherein the metal alkoxide comprises a metal selected from the group consisting of titanium, aluminum zirconium, germanium, tin, lead, and antimony.

20. A process as defined in claim 17, wherein the step of drying comprises a step of elevating the temperature of the gel sufficiently to dry the gel under supercritical conditions.

21. A process as defined in claim 17, wherein the step of drying comprises a step of elevating the temperature of the gel sufficiently to dry the gel under subcritical conditions.

22. A process as defined in claim 17, wherein the step of drying comprises a step of elevating the temperature of the gel to above 200° C.

23. A process as defined in claim 17, wherein:
the solution used in the step of placing consists essentially of the following components, in prescribed relative proportions
  tetraethyl orthosilicate or tetramethyl orthosilicate;
  an alcohol,
  deionized water; and
  an acid catalyst and/or a base, catalyst; and
the process further comprises a step of sintering the dried gel monolith after the step of removing, to produce a silica glass monolith.

24. A process as defined in claim 20, and further comprising steps of aging the gel within the mold, before the step of drying.

25. A process as defined in claim 17, wherein the solution used in the step of placing comprises the following components, in prescribed relative proportions:
  deionized water;
  colloidal silica;
  a dispersant; and
  an acid catalyst and/or a base catalyst.

26. A process as defined in claim 17, wherein the solution used in the step of placing consists essentially of the following components, in prescribed relative proportions:
  tetraethyl orthosilicate or tetramethyl orthosilicate;
  an alcohol;
  deionized water;
  colloidal silica;
  a dispersant; and
  an acid catalyst and/or a base catalyst.

27. A process as defined in claim 17, wherein the mold used in the steps of placing, allowing, drying and removing has a substantially uniform thickness in the range of 3 to 5 mm.

28. A process as defined in claim 27, wherein the non-porous inner skin of the mold has a thickness of less than about 1 mm.

29. A process as defined in claim 17, wherein:

the process further comprises a step of aging the gel within the mold, before the step of drying; and wherein the step of aging includes a step of adding a topping liquid to the mold, wherein the topping liquid has substantially the same composition as the pore liquid and is added to a depth in the range of about 1 to 20 mm.

30. A process as defined in claim 17, wherein:

the process further comprises a step of aging the gel within the mold, before the step of drying; and the steps of allowing the solution to gel, aging the gel, and drying the gel all occur while the solution and gel remain located within the mold.

31. A process as defined in claim 30, wherein the steps of allowing the solution to gel, aging the gel, and drying the gel all occur while the mold is located within an autoclave.

* * * * *

UNITED STATES PATENT AND TRADEMARK OFFICE
CERTIFICATE OF CORRECTION

PATENT NO. : 6,514,454 B1 Page 1 of 1
APPLICATION NO. : 09/807109
DATED : February 4, 2003
INVENTOR(S) : Ganguli et al.

It is certified that error appears in the above-identified patent and that said Letters Patent is hereby corrected as shown below:

Column 7, line 7, "supercitical" should be -- supercritical --.
, line 16, "follow" should be -- following --.
, line 25, "consisting" should be -- comprising --.
, line 58, "adding" should be -- aging --.

Signed and Sealed this

Third Day of October, 2006

JON W. DUDAS
*Director of the United States Patent and Trademark Office*